(12) United States Patent
Deeter et al.

(10) Patent No.: US 8,957,130 B2
(45) Date of Patent: Feb. 17, 2015

(54) LOW VOC SOLVENT-BORNE PRINTING INKS

(75) Inventors: Gary A. Deeter, Livonia, MI (US); Chien Hsu, Grosse Ile, MI (US); Timothy D. Klots, Plymouth, MI (US)

(73) Assignee: BASF SE, Ludwigshafen (DE)

( * ) Notice: Subject to any disclaimer, the term of this patent is extended or adjusted under 35 U.S.C. 154(b) by 166 days.

(21) Appl. No.: 13/383,462

(22) PCT Filed: Jul. 14, 2010

(86) PCT No.: PCT/US2010/041902
§ 371 (c)(1),
(2), (4) Date: Feb. 16, 2012

(87) PCT Pub. No.: WO2011/008808
PCT Pub. Date: Jan. 20, 2011

(65) Prior Publication Data
US 2012/0141747 A1    Jun. 7, 2012

Related U.S. Application Data

(60) Provisional application No. 61/225,350, filed on Jul. 14, 2009.

(51) Int. Cl.
C09D 11/10    (2014.01)
C08F 20/04    (2006.01)
(Continued)

(52) U.S. Cl.
CPC .............. *C09D 11/033* (2013.01); *C08L 33/06* (2013.01); *C08L 35/06* (2013.01); *C09D 11/106* (2013.01); *C09D 133/06* (2013.01);
(Continued)

(58) Field of Classification Search
USPC .......... 524/502, 556, 575, 560, 505; 523/160; 428/195.1
See application file for complete search history.

(56) References Cited

U.S. PATENT DOCUMENTS 5,782,965 A * 7/1998 Ishida et al. ............... 106/31.33
6,326,449 B1 * 12/2001 Haldankar ................. 526/310
(Continued)

FOREIGN PATENT DOCUMENTS

CN    101125978    2/2008
CN    101133131    2/2008
(Continued)

OTHER PUBLICATIONS http://worldaccount.basf.com/wa/NAFTA~en_US/Catalog/ChemicalsNAFTA/pi/BASF/Brand/pluronic, 2001.*
(Continued)

*Primary Examiner* — Satya Sastri
(74) *Attorney, Agent, or Firm* — Foley & Lardner, LLP

(57) ABSTRACT

Styrene-acrylic dispersants for use in pigment dispersions have lower viscosities than benchmark formulations such as nitrocellulose, dimer-acid based polyamides, and thermoplastic polyurethanes, prepared under otherwise identical conditions. Lower viscosities allow for the preparation of similarly viscous dispersions and inks with the styrene-acrylics when compared to traditional dispersants, at either (a) lower solvent levels, or if solvent levels are to be maintained, (b) higher pigment and solids loadings.

21 Claims, 5 Drawing Sheets

(51) Int. Cl.

| | | |
|---|---|---|
| C08F 20/18 | (2006.01) | |
| C08F 20/06 | (2006.01) | |
| C08F 12/06 | (2006.01) | |
| B32B 3/10 | (2006.01) | |
| C09D 11/033 | (2014.01) | |
| C08L 33/06 | (2006.01) | |
| C08L 35/06 | (2006.01) | |
| C09D 11/106 | (2014.01) | |
| C09D 133/06 | (2006.01) | |
| C09D 135/06 | (2006.01) | |
| C08F 212/08 | (2006.01) | |
| C08L 25/14 | (2006.01) | |
| C08L 25/16 | (2006.01) | |
| C08L 33/08 | (2006.01) | |
| C08L 75/04 | (2006.01) | |
| C08L 77/00 | (2006.01) | |

(52) U.S. Cl.
CPC ............ *C09D 135/06* (2013.01); *C08F 212/08* (2013.01); *C08L 25/14* (2013.01); *C08L 25/16* (2013.01); *C08L 33/08* (2013.01); *C08L 75/04* (2013.01); *C08L 77/00* (2013.01)
USPC ........... 523/160; 524/502; 524/556; 524/560; 524/575; 524/505; 428/195.1

(56) References Cited

U.S. PATENT DOCUMENTS

| | | | |
|---|---|---|---|
| 6,338,875 B1 | | 1/2002 | Boucher et al. |
| 6,395,805 B1 * | | 5/2002 | Takao .......................... 523/205 |
| 6,656,595 B2 * | | 12/2003 | Nakajima et al. ............. 428/413 |
| 2006/0106132 A1 | | 5/2006 | Ma et al. |
| 2009/0015281 A1 | | 1/2009 | Yoshioka et al. |
| 2009/0018245 A1 | | 1/2009 | Idemura et al. |

FOREIGN PATENT DOCUMENTS

| | | |
|---|---|---|
| JP | 56-095326 A | 8/1981 |
| JP | 11-058929 A | 3/1999 |
| JP | 2000-234074 | 8/2000 |
| JP | 2001-031900 | 2/2001 |
| JP | 2007-246841 | 9/2007 |
| WO | WO-2009/015281 | 1/2009 |

OTHER PUBLICATIONS

Office Action issued in related China patent application No. 201080031832.X dated Jun. 20, 2013 (8 pages).

International Search Report and Written Opinion; in re: PCT International Patent Application No. PCT/US2010/041902; Applicant: BASF Corporation; Mailed: Feb. 21, 2011.

International Preliminary Report on Patentability issued in PCT/US2010/041902 and mailed on Jan. 26, 2012.

Second Office Action received in Chinese Patent Application No. 201080031832.X issued Jan. 15, 2014 (9 pages).

Examination Report No. 1 issued in Australian Patent Application No. 2010273513 issued Feb. 18, 2014 (4 pages).

Office Action received in Japanese Patent Application No. 2012-520733 issued Mar. 18, 2014 (8 pages).

* cited by examiner

LOW VOC SOLVENT-BORNE PRINTING INKS

SUMMARY

Typical inks used in solvent-borne printing applications contain high levels of solvent, i.e. 50 to 70%, or more. However, it is well known that the drying of inks by the evaporation of the solvents leads to undesirable environmental and health effects. Therefore, the reduction or elimination of solvents from inks is a continuing goal of the ink industry.

The styrene-acrylic dispersions, and methods of the their preparation and use, embodied herein, provide for the preparation of high solids pigment dispersions that can be used to prepare low volatile organic component (VOC) solvent-borne printing inks. In general, the amount of solvent used in the styrene-acrylic dispersions and inks is significantly reduced when compared to the amount of solvent required for benchmark dispersants, such as nitrocellulose. Such solvent reductions with the styrene-acrylic dispersants may provide for significant cost and environmental savings, without sacrificing performance of the dispersions, or the inks.

In one aspect, a low VOC, high solids composition for solvent borne printing inks is provided including a styrene-acrylic copolymer; a polymeric binder; a colorant; and a solvent.

In another aspect, a composition is provided including a styrene-acrylic copolymer polymerized from a reaction mixture including 15 to 50 wt % of a styrenic monomer, 10 to 35 wt % of a functional monomer, 10 to 30 wt % of an $C_1$-$C_4$ alkyl(meth)acrylate, 20 to 55 wt % of an $C_5$-$C_{12}$ alkyl(meth)acrylate, and 0 to 20 wt % of a ethylenic monomer, where the total wt % of the $C_1$-$C_4$ alkyl(meth)acrylate and the $C_5$-$C_{12}$ alkyl(meth)acrylate is less than 60 wt % of the total wt % of the styrenic monomer, the functional monomer, the $C_1$-$C_4$ alkyl(meth)acrylate, the $C_5$-$C_{12}$ alkyl(meth)acrylate, and the ethylenic monomer; a polymeric binder; a colorant; and a solvent. In some embodiments, the composition is a low VOC, high solids, solvent-borne printing ink.

In some embodiments, the functional monomer is a monomer having a carboxylic acid or hydroxyl functional group. In some embodiments, the polymeric binder is a polyamide, a polyurethane, a nitrocellulose, an acrylic, a maleic, a rosin, a modified rosin, or a mixture of any two or more thereof. In some embodiments, the colorant is an inorganic pigment, a, organic pigment, a dye, or a mixture of any two or more thereof. In some embodiments, the styrene-acrylic copolymer is produced by a high-temperature continuous polymerization process. In some embodiments, the solvent is an alcohol, an acetate, a glycol ether, or a mixture of any two or more thereof.

In some embodiments, the composition has a viscosity of less than 100 cps at a solid content of at least 60 wt %. In other embodiments, the composition has a solids content that is from about 10% to 30% greater than a second composition comprising the dispersant, colorant and solvent, and the composition and the second composition have about the same viscosity. In yet other embodiments, the composition has from about 10% to 30% less solvent than a second composition comprising the dispersant, colorant and solvent, the composition and the second composition having about the same viscosity.

In some embodiments, the printing ink has an adhesion rating of at least 90% on a substrates selected from the group consisting of polyethylene terephthalate, polypropylene, oriented polypropylene, and polyethylene film.

In some embodiments, the composition includes a co-dispersant. In some embodiments, the co-dispersant is a high molecular weight A-B block copolymer including a block A comprising tertiary amine functionality, and a block B comprising styrene and acrylic monomers; a Tetronic® having a molecular weight of less than 19,000 and a hydrophilic-lipophilic balance of less than 25; a Pluronic® having a molecular weight of less than 8,000 and a hydrophilic-lipophilic balance of less than 26; an alkoxylated amine comprising ethylene oxide and propylene oxide and having a molecular weight of approximately less than 7,000; or a modified polyurethane. As used herein, a Tetronic® is a tetra-functional block copolymer based on ethylene oxide and propylene oxide. As used herein, a Pluronic® is a block copolymer based on ethylene oxide and propylene oxide.

In another aspect, a printed substrate is provided, the printed substrate includes an ink including a styrene-acrylic copolymer polymerized from a reaction mixture including 15 to 50 wt % of a styrenic monomer, 10 to 35 wt % of a functional monomer, 10 to 30 wt % of an $C_1$-$C_4$ alkyl(meth)acrylate, 20 to 55 wt % of an $C_5$-$C_{12}$ alkyl(meth)acrylate, and 0 to 20 wt % of a ethylenic monomer, where the total wt % of the $C_1$-$C_4$ alkyl(meth)acrylate and the $C_5$-$C_{12}$ alkyl(meth)acrylate is less than 60 wt % of the total wt % of the styrenic monomer, the functional monomer, the $C_1$-$C_4$ alkyl(meth)acrylate, the $C_5$-$C_{12}$ alkyl(meth)acrylate, and the ethylenic monomer; a polymeric binder; and a colorant; where the ink has a gloss that is from about 5% to 20% greater than an ink comprising the polymeric binder and the colorant. In some embodiments, the ink has a gloss that is about 10% greater than a second ink comprising the polymeric binder and the colorant. In some embodiments, the contrast ratio of the ink is greater than that of an ink comprising the polymeric binder and the colorant by 5% to 20%. In other embodiments, the printed image has a 20° gloss reading of at least 70, and a contrast ratio of at least 65.

In another aspect, a composition includes a styrene-acrylic copolymer polymerized from a reaction mixture including 15 to 50 wt % of a styrenic monomer, 10 to 35 wt % of a functional monomer, 10 to 30 wt % of an $C_1$-$C_4$ alkyl(meth)acrylate, 20 to 55 wt % of an $C_5$-$C_{12}$ alkyl(meth)acrylate, and 0 to 20 wt % of a ethylenic monomer, where the total wt % of the $C_1$-$C_4$ alkyl(meth)acrylate and the $C_5$-$C_{12}$ alkyl(meth)acrylate is less than 60 wt % of the total wt % of the styrenic monomer, the functional monomer, the $C_1$-$C_4$ alkyl(meth)acrylate, the $C_5$-$C_{12}$ alkyl(meth)acrylate, and the ethylenic monomer; a polymeric binder; a colorant; a co-dispersant that is a high molecular weight A-B block copolymer, Tetronic® having a molecular weight of less than 19,000 and a hydrophilic-lipophilic balance of less than 25, a Pluronic® having a molecular weight of less than 8,000 and a hydrophilic-lipophilic balance of less than 26, an alkoxylated amine including ethylene oxide and propylene oxide and having a molecular weight of approximately less than 7,000; or a modified polyurethane; and a solvent. In some embodiments, the composition is a low VOC, high solids, solvent-borne printing ink. In other embodiments, the composition has a viscosity of less than 100 cps at a solid content of at least 60 wt %.

DETAILED DESCRIPTION

Figure 1:
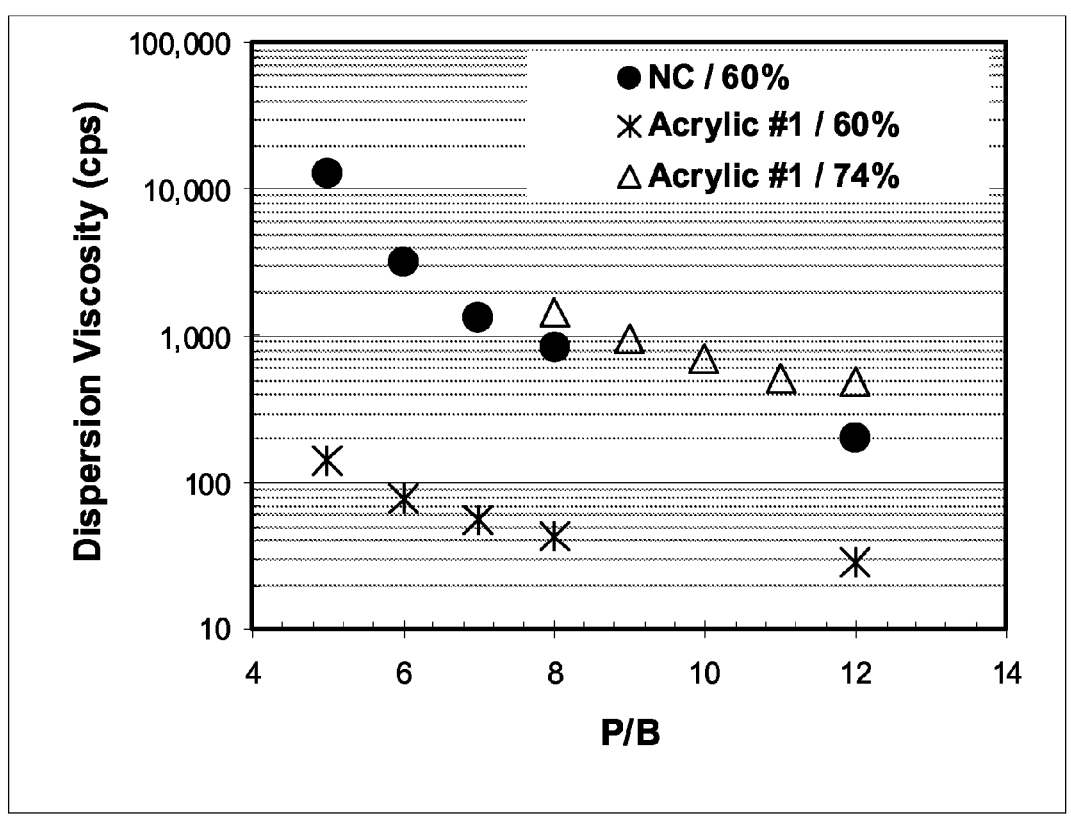
FIG. 1 is a graph of the dispersion viscosity versus the pigment to binder ratio (P/B) for titanium dioxide dispersions in either nitrocellulose (NC) or nitrocellulose with a styrene-acrylic dispersant (Acrylic #1), according to one example. The P/B was varied between 4:1 and 12:1.

According to one aspect, compositions including styrene-acrylic dispersants provide numerous advantages as pigment dispersions as compared to industrial benchmark dispersants such as nitrocellulose, dimer-acid based polyamides, and thermoplastic polyurethanes, when used under otherwise identical conditions. For example, when pigment dispersions are prepared, the styrene-acrylic dispersants demonstrate lower viscosities than the benchmark formulations prepared under otherwise identical conditions. The use of the styrene-acrylic dispersant allows for the preparation of compositions of either equal pigment loading at lower viscosity or higher pigment loading and equal viscosity.

As used herein, the term "dispersant" means a non-surface active polymer or a surface-active polymer that is added to a suspension, to prevent or reduce agglomeration of suspended particles and to prevent or reduce settling. With respect to inks, dispersants aid in suspending the pigments used for coloration of the ink.

As used herein, in general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; ethers; urethanes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; enamines; imides; isocyanates; isothiocyanates; cyanates; thiocyanates; imines; nitro groups; nitriles (i.e., CN); and the like.

Alkyl groups, as used herein, include straight chain and branched alkyl groups having from 1 to 20 carbon atoms, and typically from 1 to 12 carbons or, in some embodiments, from 1 to 8, 1 to 6, or 1 to 4 carbon atoms. Alkyl groups further include cycloalkyl groups having 3 to 8 ring members. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Cycloalkyl groups, as used herein, are cyclic alkyl groups such as, but not limited to, cyclopropyl, cyclobutyl, cyclopentyl, cyclohexyl, cycloheptyl, and cyclooctyl groups, and also include bridged cycloalkyl groups. Representative substituted alkyl groups can be unsubstituted or substituted.

In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups can be substituted one or more times with, non-hydrogen and non-carbon groups as defined above. However, substituted cycloalkyl groups also include rings that are substituted with straight or branched chain alkyl groups as defined above. Representative substituted cycloalkyl groups can be mono-substituted or substituted more than once, such as, but not limited to, 2,2-, 2,3-, 2,4- 2,5- or 2,6-disubstituted cyclohexyl groups, which can be substituted with substituents such as those listed above. Cycloalkyl groups can also be bridged cycloalkyl groups in which two or more hydrogen atoms are replaced by an alkylene bridge, wherein the bridge can contain 2 to 6 carbon atoms if two hydrogen atoms are located on the same carbon atom, or 1 to 5 carbon atoms, if the two hydrogen atoms are located on adjacent carbon atoms, or 2 to 4 carbon atoms if the two hydrogen atoms are located on carbon atoms separated by 1 or 2 carbon atoms. Bridged cycloalkyl groups can be bicyclic, such as, for example bicyclo[2.1.1]hexane, or tricyclic, such as, for example, adamantyl. Representative bridged cycloalkyl groups include bicyclo[2.1.1]hexyl, bicyclo[2.2.1]heptyl, bicyclo[3.2.1]octyl, bicyclo[2.2.2]octyl, bicyclo[3.2.2]nonyl, bicyclo[3.3.1]nonyl, bicyclo[3.3.2]decanyl, adamantyl, noradamantyl, bornyl, or norbornyl groups. Substituted bridged cycloalkyl groups can be unsubstituted or substituted one or more times with non-hydrogen and non-carbon groups as defined above. Representative substituted bridged cycloalkyl groups can be mono-substituted or substituted more than once, such as, but not limited to, mono-, di- or tri-substituted adamantyl groups, which can be substituted with substituents such as those listed above.

Alkenyl groups, as used herein, include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, —CH═CH(CH$_3$), —CH═C(CH$_3$)$_2$, —C(CH$_3$)═CH$_2$, —C(CH$_3$)═CH(CH$_3$), CH═CHCH═CH$_2$, C(CH$_2$CH$_3$)═CH$_2$, cyclohexenyl, cyclopentenyl, cyclohexadienyl, butadienyl, pentadienyl, and hexadienyl, among others. Alkenyl groups may be substituted or unsubstituted. Representative substituted alkenyl groups can be mono-substituted or substituted more than once, such as, but not limited to, mono-, di- or tri-substituted with substituents such as those listed above.

Aryl groups, as used herein, are cyclic aromatic hydrocarbons that do not contain heteroatoms. Aryl groups include monocyclic, bicyclic and polycyclic ring systems. Thus, aryl groups include, but are not limited to, cyclopentadienyl, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 5-14 carbons, and in others from 5 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Aryl groups may be substituted or unsubstituted. Representative substituted aryl groups can be mono-substituted or substituted more than once. For example, monosubstituted aryl groups include, but are not limited to, 2-, 3-, 4-, 5-, or 6-substituted phenyl or naphthyl groups, which can be substituted with substituents such as those listed above.

Alkoxy groups, as used herein, are hydroxyl groups (—OH) in which the bond to the hydrogen atom is replaced by a bond to a carbon atom of a substituted or unsubstituted alkyl group as defined above. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Examples of cycloalkoxy groups include but are not limited to cyclopropyloxy, cyclobutyloxy, cyclopentyloxy, cyclohexyloxy, and the like. Two subsets of alkoxy groups are "aryloxy" and "arylalkoxy," as used herein, refer to, respectively, a substituted or unsubstituted aryl group bonded to an oxygen atom and a substituted or unsubstituted aralkyl group bonded to the oxygen atom at the alkyl. Alkoxy groups may be substituted or unsubstituted. Representative substituted alkoxy groups can be substituted one or more times with substituents such as those listed above.

According to one aspect, the compositions include the styrene-acrylic copolymer, a polymeric binder, a colorant, and a solvent. The styrene-acrylic copolymers are prepared from a monomer mixture of at least a styrenic monomer, a functional monomer, a $C_1$-$C_4$ alkyl(meth)acrylate, a $C_5$-$C_{12}$ alkyl(meth)acrylate, and, optionally, an ethylenic monomer. Such compositions may be dispersions or inks that have a low VOC, and have high solids content.

As used herein, low VOC is a relative term referring to a composition having a lower amount of volatile organic components as compared to a conventionally prepared composition. In some embodiments, low VOC compositions have less than or equal to 35% volatile organic content in dispersions, and less or equal to 50% volatile organic content in prepared inks.

Suitable styrenic monomers for use in the styrene-acrylic copolymer include those having a substituted or unsubstituted phenyl group attached to an ethylene moiety. Styrenic monomers include, but are not limited to, styrene and α-methylstyrene, and combinations thereof. Suitable styrenic monomers include, but are not limited to, styrene, α-methylstyrene, p-methylstyrene, t-butylstyrene, o-chlorostyrene, vinyl pyridine, and mixtures of these species. In some embodiment, the styrenic monomers include styrene and α-methyl-styrene. The styrenic monomer(s) may be included in the styrene-acrylic copolymer from about 15 to 50 wt %, based upon the total monomer content of the styrene-acrylic copolymer.

According to some embodiments, the styrene-acrylic copolymers include a functional monomer. As used herein, a "functional monomer" is a monomer that has functionality that will survive the polymerization process and cause the copolymer to retain such functionality or retain a reaction product of such functionality. For example, functionality may be imparted by polar-protic, polar-aprotic, or non-polar groups on the monomer. Polar-protic groups include, but are not limited to alcohols, primary amines, secondary amines, acids, thiols, sulfates, and phosphates. Polar-aprotic groups include, but are not limited to, esters, oxides, ethers, tertiary amines, ketones, aldehydes, carbonates, nitriles, nitros, sulfoxides, and phosphines. Polar-aprotic groups include those imparted to the styrene-acrylic dispersant by (meth)acrylates. Non-polar groups include, but are not limited to, alkyl and aryl groups, including those imparted to the styrene-acrylic dispersant by the monomers of styrene, methyl styrene, 2-ethyl hexyl acrylate, butyl acrylate, octyl acrylate, stearyl acrylate, and behenyl acrylate. For the styrene-acrylic dispersant to remain soluble, the appropriate ratio of non-polar to polar-protic groups must be maintained. Significant levels of polar-protic groups improve solubility. As the amount of non-polar groups increase so should the polar-protic groups. In some embodiments, the functional monomer is a monomer having a carboxylic acid or a hydroxyl group. The functional monomer(s) may be included in the styrene-acrylic copolymer from about 10 to 35 wt %, based upon the total monomer content of the styrene-acrylic copolymer.

According to some embodiments, the styrene-acrylic copolymer is produced by a high-temperature continuous polymerization process. The styrene-acrylic copolymers may be produced using batch, continuous or semi-continuous emulsion polymerizations. The polymerizations may be single or multi-stage polymerizations. For example, continuous polymerization processes are described in U.S. Pat. Nos. 4,546,160; 4,414,370; and 4,529,787, the entire disclosures of which are incorporated herein by reference.

Non-polar or polar-aprotic solubilizing agents, containing pendant, terminal, or main-chain polar-protic or polar-aprotic functionality may also be used to impact the solubility. For example, secondary and tertiary amines containing ethoxylate, propoxylate, alkyl, or alkyl phenol groups; alkyl phenols; fatty alcohols; polypropylene, polyethylene oxides and their copolymers; alkyl amides and esters, may be used in the solvent systems. However, interactions between the polar-protic functionality contained in the dispersant and the solubilizing agent should be minimized to prevent solution instability. Such instability may arise from, for example, salt formation between carboxylic acids functionality and amine solubilizing agents.

Alkyl(meth)acrylate monomers are also used in the styrene-acrylic copolymers. A mixture of $C_1$-$C_4$ alkyl(meth) acrylates and $C_5$-$C_{12}$ alkyl(meth)acrylates may be used. $C_1$-$C_4$ alkyl(meth)acrylates, include compounds such as methyl(meth)acrylate, ethyl(meth)acrylate, n-propyl(meth) acrylate, iso-propyl(meth)acrylate), n-butyl(meth)acrylate), iso-butyl(meth)acrylate, tert-butyl(meth)acrylate, and any mixtures of any two or more. $C_5$-$C_{12}$ alkyl(meth)acrylates, include compounds such as pentyl(meth)acrylate, hexyl (meth)acrylate, heptyl(meth)acrylate, octyl(meth)acrylate, nonyl(meth)acrylate), decyl(meth)acrylate), undeca(meth)

acrylate, dodecyl(meth)acrylate, a mixture of any two or more such compounds, and any of the various alkyl isomers thereof. For example, the alkyl isomers of "pentyl" (meth) acrylate include n-pentyl, iso-pentyl, neo-pentyl, sec-pentyl, etc.

The $C_1$-$C_4$ alkyl(meth)acrylate monomers may be included in the styrene-acrylic copolymer from about 10 to 30 wt %, based upon the total monomer content of the styrene-acrylic copolymer. The $C_5$-$C_{12}$ alkyl(meth)acrylate monomers may be included in the styrene-acrylic copolymer from about 20 to 55 wt %, based upon the total monomer content of the styrene-acrylic copolymer. However, the total content of the $C_1$-$C_4$ alkyl(meth)acrylate monomers and the $C_5$-$C_{12}$ alkyl(meth)acrylate monomers is less than about 60 wt % of the total monomer content of the styrene-acrylic copolymer.

According to some embodiments, the styrene-acrylic copolymers optionally include an ethylenic monomer. As used herein, the term ethylenic includes monomers containing carbon-carbon double bonds. Examples of ethylenic include, but are not limited to, ethylene, propylene, vinyl chloride, vinyl bromide, vinyl fluoride, maleic anhydride, fumaric acid, acrylonitrile, methacrylontrile, alpha olefins, or mixtures of any two or more such compounds. The ethylenic monomers may be included in the styrene-acrylic copolymer from zero to about 20 wt %, based upon the total monomer content of the styrene-acrylic copolymer.

Polymer binders suitable for use in the compositions include the polymeric binders known in the art for inks and coatings. For example, some polymeric binders include, but are not limited to, acrylics, vinyls (including, but not limited to styrenics, polyvinyl alcohols, and polyvinyl acetates), acrylic/vinyls, dimer-acid based polyamides, polyurethanes, polyamides, polyesters, polyethylene glycols, styrene-butadiene-rubber (SBR) polymers, nitrocelluloses, rosins, rosin esters, maleated rosin esters, fumarated rosin esters, hybrids of such materials, or blends of such materials. In some embodiments, the polymeric binder is a polyamide, dimer-acid based polyamide, a polyurethane, a nitrocellulose, an acrylic, a maleic, a rosin, a modified rosin, or a mixture of any two or more such compounds. Hybrid polymers are compositions containing more than one type of polymer and are made by sequential polymerization of one polymer in the presence of another. Hybrid polymers can include copolymers wherein the preparation of the second polymer in the presence of the first polymer results in the formation of copolymer. Other suitable polymeric binders include natural polymers including, but not limited to proteins, (hydroxyethyl)cellulose, cotton, starch and the like.

Colorants, or pigments, are added to the compositions, according to the various embodiments. In some embodiments, the colorant is an inorganic pigment, an organic pigment, a dye, or a mixture of any two or more such compounds. Other suitable colorants, or pigments, may include, but are not limited to, bright pigments such as aluminum powder, copper powder, nickel powder, stainless steel powder, chromium powder, micaceous iron oxide, titanium dioxide-coated mica powder, iron oxide-coated mica powder, and bright graphite; organic red pigments such as Pink EB, azo- and quinacridone-derived pigments; organic blue pigments such as cyanin blue and cyanin green; organic yellow pigments such as benzimidazolone-, isoindolin- and quinophthalone-derived pigments; inorganic colored pigments such as titanium dioxide (white), titanium yellow, iron red, carbon black, chrome yellow, iron oxide and various calcined pigments. Additionally, extender pigments may be included. Other examples of suitable pigments include, but are not limited to Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080 and Raven 1060 (commercially available from Columbian Carbon Co.); Rega1400R, Rega1330R, Rega1660R, Mogul L, Black Pearls L, Monarch 700, Monarch 800, Monarch 880, Monarch 900, Monarch 1000, Monarch 1100, Monarch 1300 and Monarch 1400 (commercially available from Cabot Co.); Color Black FW1, Color Black FW2, Color Black FW2V, Color Black 18, Color Black FW200, Color Black S150, Color Black S160, Color Black S170, Printex35, PrintexU, PrintexV, Printex140U, Printex140V, Special Black 6, Special Black 5, Special Black 4A and Special Black 4 (commercially available from Degussa Co.); No. 25, No. 33, No. 40, No. 47, No. 52, No. 900, No. 2300, MCF-88, MA600, MA7, MA8 and MA100 (commercially available from Mitsubishi Chemical Corporation); cyanic color pigment like C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, Pigment Blue 15:4; C.I. Pigment Blue-16, C.I. Pigment Blue-22 and C.I. Pigment Blue-60; magenta color pigment like C.I. Pigment Red-5, C.I. Pigment Red-7, C.I. Pigment Red-12, C.I. Pigment Red-48, C.I. Pigment Red-48:1, C.I. Pigment Red-57, Pigment Red-57:1, C.I. Pigment Red-112, C.I. Pigment Red-122, C.I. Pigment Red-123, C.I. Pigment Red-146, C.I. Pigment Red-168, C.I. Pigment Red-184 and C.I. Pigment Red-202; and yellow color pigment like C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154. Suitable pigments include a wide variety of carbon black, blue, red, yellow, green, violet, and orange pigments.

The dispersant and ink compositions may include a solvent. A number of suitable solvents may be used in different inks, limited only by the print methodology in which the inks are to be employed. Generally, suitable solvents include alcohols, acetates, glycol ethers, or a mixture of any two or more thereof. For example, flexographic inks typically utilize alcohols such as ethyl alcohol, n-propyl alcohol, or iso-propyl alcohol; acetates such as ethyl acetate, propyl acetate, or butyl acetate; glycol ethers such as ethylene glycol, or propylene glycol; or blends of any two or more thereof. However, when preparing the dispersant for use in various inks for different printing methods, blends of polar-protic and polar-aprotic solvents may be used.

In some embodiments, the dispersant-solvent; dispersant-pigment surface; and dispersant-ink binder interactions may be optimized. Three primary methodologies may be used to evaluate and provide information on the appropriate optimization parameters: 1) Drago's acceptor-donor interactions; 2) Hansen's three-dimensional solubility parameters; and 3) hydrophilic-lipophilic balance.

Hansen Solubility Parameters are based on Hildebrand's early solution theory, relating solubility to the cohesive energy density ($E^V/V$) of the solvent and solute (eq. 1). Chemical compounds that have strong intermolecular interactions demonstrate high cohesive energies and will only dissolve in solvents that can overcome these interactions, making it necessary that the solvent and solute have similar $E^V/V$. The simple expression, "Likes, like, likes" clearly demonstrates the essence of Hildbrand's work. For example, pentane and water have very different cohesive energy densities and solubility parameters and are therefore insoluble in one another.

$$\Delta H^M \approx \left[\left(\frac{\Delta E_1^V}{V_1}\right)^{1/2} - \left(\frac{\Delta E_2^V}{V_2}\right)^{1/2}\right]^2 \quad (1)$$

The square root of $E^V/V$ was named the Hildebrand solubility parameter ($\delta$). This formulation did not describe all of the important interactions governing solubility. Therefore, greater refinement was accomplished by including contributions from the dispersion (D), polar (P), and hydrogen bonding (HB) forces between solvent and solute (eq. 2). Dispersion forces are present in all molecular contact and are due to the interaction of the electron fields of adjacent molecules. Polar and hydrogen bonding interactions are a result of a heterogeneous distribution of electron density about a molecules center of mass. The unequal electron distribution polarizes chemical bonds, leading to partially negative charges where high electron density occurs and partially positive at low electron density sites. An example of high electron density would be the oxygen atom in a water molecule and low electron density the two hydrogen atoms. Hydrogen bonding (HB) and polar (P) forces are the result of the interactions that develop between partially positive and negative centers. Examples of these two types of interactions are hydrogen bonding between two water molecules and dipole, dipole interactions between polar carbonyl groups.

$$\frac{\Delta E^V}{V} = \delta_T^2 = \delta_D^2 + \delta_P^2 + \delta_{HB}^2 \quad (2)$$

Equation 3 is often used to predict and understand solubility, compatibility, and polymer-pigment surface interactions. In general, the lower the calculated difference the greater the solubility, compatibility and interaction with surfaces.

$$\text{Difference} = \sqrt{(\delta_{D1}-\delta_{D2})^2 + (\delta_{P1}-\delta_{P2})^2 + (\delta_{HB1}-\delta_{HB2})^2} \quad (3)$$

Drago's model describes the interactions between Lewis acids and bases. Lewis acids are chemical compounds that accept electrons and bases donate electrons. When Lewis acids and bases interact they form adducts. Drago's model uses four parameters to calculate the heat of acid, base adduct formation ($\Delta H_{ab}$, eq. 4) and the greater the heat of formation the more favorable is the acid, base interaction. The acids and bases are characterized by their tendency to interact electrostatically ($E_x$) or covalently ($C_x$) and are related to their charge state and polarizability, respectively. Adduct formation will be favored when pairs have similar electrostatic and covalent character. This method has been used to predict and understand solvent-pigment and polymer-pigment interactions and surface wetting and adhesion.

$$-\Delta H_{ab} = E_A E_B + C_A C_B \quad (4)$$

Equation 4 is often used to predict and understand solubility, compatibility, and polymer-pigment surface interactions. In general, the higher the calculated heats of interaction the greater the solubility, compatibility and interaction with surfaces.

Hydrophobic-lipophilic balances (HLB) are calculated using equation 4 and simply are the ratio of hydrophilic content to that of the hydrophobic moieties. These values can be applied to understand and predict pigment and surface wetting, surface tension, and contact angles.

$$HLB = 100 \times \left[\frac{\sum W_{Hydophilic}}{5 \times W_{Total}}\right] \quad (4)$$

Balancing of the functionality of the styrene-acrylics and the solvents is one consideration in the preparation of stable dispersions and inks. For the styrene-acrylic dispersant to remain soluble, the appropriate ratio of non-polar to polar-protic groups must be maintained. Significant levels of polar-protic groups improve solubility. As the amount of non-polar groups increase so should the polar-protic groups. Interactions between polar-protic functionality contained in the dispersant and any solubilizing agents should be minimized to prevent solution instability. For example, such instability may arise from salt formation between carboxylic acids functionality and amine solubilizing agents.

The compositions may also, optionally, include a co-dispersant. Co-dispersants are typically used to enhance the stabilizing effects of the styrene-acrylic dispersants in a coating formulation. Co-dispersants may include materials such as, but not limited to, a Tetronic® having a molecular weight of less than 19,000 and a hydrophilic-lipophilic balance of less than 25, a Pluronic® having a molecular weight of less than 8,000 and a hydrophilic-lipophilic balance of less than 26, an alkoxylated amine, a fatty acid modified polyester, a modified polyurethane, or a high-molecular weight A-B block polymer, or a mixture of any two or more such materials. Specific examples include, but are not limited to, those compounds available from BASF Corporation as Tetronic® 1107, 1301, 1304, 1307, 150R1, 701, 904, 908, and 90R4. Pluronic® compounds are block copolymers based on ethylene oxide and propylene oxide having a molecular weight of less than 8,000 and a hydrophilic-lipophilic balance of less than 26. Specific examples include those compounds available from BASF Corporation as Pluronic® 10R5, 17R2, 25R2, 31R1, F108, F127, F38, F68, F77, F87, F88, F98, L10, L101, L121, L31, L35, L43, L44, L61, L62, L64, L81, L92, L44, P3, P103, P104, P105, P123, P65, P84, and P85. Suitable alkoxylated amines include those having ethylene and propylene oxide and having a molecular weight of approximately 7,000. Jeffamine® M2070 (available from Huntsman Corporation), has a molecular weight of approximately 2,000 and prepared from about 70 wt % ethylene oxide and 30 wt % propylene oxide, is one example of a suitable alkoxylated amine. Suitable fatty acid modified polyesters include, but ais not limited to EFKA® 6225 (available from Ciba (now BASF) Specialty Chemicals). Suitable modified polyurethanes include, but are not limited to EFKA® 4046 and 4047 (available from Ciba (now BASF) Specialty Chemicals). Suitable high molecular weight A-B copolymers include those compounds where block A has tertiary amine functionality and block B is prepared from styrene and acrylic monomers. For example, modified A-B copolymers include, but are not limited to those EFKA® 4330 or 4340 (available from Ciba Specialty Chemicals).

As noted above, the compositions of dispersions having the styrene-acrylic copolymers, are less viscous than conventionally prepared dispersions. In some embodiments, where the solid content of the composition is at least 60 wt %, the viscosity is less than 100 cps (centipoise). Because of this reduction in viscosity, higher solids content materials are able to be prepared while achieving the about same viscosity as conventionally prepared formulations. For example, in some embodiments, the compositions have a solids content that is from about 10% to 30% greater than a corresponding, or second, composition having the polymeric binder, colorant, and solvent.

Complementary to this is a reduction in solvent content of the composition so that about the same viscosities are achieved when compared to conventionally prepared dispersions. For example, in some embodiments, the composition has from about 10% to 30% less solvent than a second composition comprising the polymeric binder, colorant and solvent, but where the composition and the second composition have about the same viscosity.

A variety of the other properties of the inks may also be impacted by the use of the styrene-acrylic co-polymer dispersants. For example, printing inks prepared with the styrene-acrylic co-polymer dispersants may have an adhesion rating of at least 90% on a substrates selected from the group consisting of polyethylene terephthalate, polypropylene, oriented polypropylene, and polyethylene film, according to some embodiments. Additionally, tape adhesion, block resistance, and water resistance properties are maintained.

In another aspect, after the ink is applied to a substrate and is cured, a printed substrates are also provided. In some embodiments, the printed image includes an ink that was prepared from a monomeric mixture including 15 to 50 wt % of a styrenic monomer, 10 to 35 wt % of a functional monomer, 10 to 30 wt % of an $C_1$-$C_4$ alkyl(meth)acrylate, 20 to 55 wt % of an $C_5$-$C_{12}$ alkyl(meth)acrylate; and 0 to 20 wt % of a ethylenic monomer. In some embodiments, the total wt % of the $C_1$-$C_4$ alkyl(meth)acrylate and the $C_5$-$C_{12}$ alkyl(meth)acrylate is less than 60 wt % of the total wt % of the styrenic monomer, the functional monomer, the $C_1$-$C_4$ alkyl(meth)acrylate, the $C_5$-$C_{12}$ alkyl(meth)acrylate, and the ethylenic monomer. The inks may also include a polymeric binder and a colorant.

The cured inks have a gloss that is from about 5% to 20% greater than an ink comprising the polymeric binder and the colorant, without the styrene-acrylic co-polymer, according to some embodiments. For example, the ink may have a gloss that is about 10% greater. Such changes in gloss and other properties also include a 5% to 20% increase in opacity, compared to a second ink comprising the polymeric binder and the colorant. In other embodiments, the printed film, prepared from the ink compositions, has a 20° gloss reading of at least 70, and a contrast ratio of at least 65.

In another aspect, a composition is provided including a styrene-acrylic copolymer that includes 15 to 50 wt % of a styrenic monomer, 10 to 35 wt % of a functional monomer, 10 to 30 wt % of an $C_1$-$C_4$ alkyl(meth)acrylate, 20 to 55 wt % of an $C_5$-$C_{12}$ alkyl(meth)acrylate, and 0 to 20 wt % of a ethylenic monomer, where the total wt % of the $C_1$-$C_4$ alkyl(meth)acrylate and the $C_5$-$C_{12}$ alkyl(meth)acrylate is less than 60 wt % of the total wt % of the styrenic monomer, the functional monomer, the $C_1$-$C_4$ alkyl(meth)acrylate, the $C_5$-$C_{12}$ alkyl(meth)acrylate, and the ethylenic monomer; a polymeric binder; a colorant; a co-dispersant that is a high molecular weight A-B block copolymer including a block A comprising tertiary amine functionality and a block B comprising styrene and acrylic monomers; a Tetronic® having a molecular weight of less than 19,000 and a hydrophilic-lipophilic balance of less than 25, a Pluronic® having a molecular weight of less than 8,000 and a hydrophilic-lipophilic balance of less than 26, an alkoxylated amine comprising ethylene oxide and propylene oxide and having a molecular weight of approximately less than 7,000, or a modified polyurethane; and a solvent. According to some embodiments, such a composition has a viscosity of less than 100 cps at a solid content of at least 60 wt %.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present embodiments, thus generally described, will be understood more readily by reference to the following examples, which are provided by way of illustration and are not intended to be limiting of the present technology in any way.

EXAMPLES

Example 1

Inks were prepared by blending titanium dioxide dispersions with nitrocellulose, a dimer acid-derived polyamide, or a thermoplastic polyurethane and diluting to a standard application viscosity (100 cps as measured by at 25 s from a Zahn 2 cup) with an appropriate solvent. The titanium dioxide dispersions were prepared using the standard nitrocellulose dispersant and numerous styrene-acrylic dispersants. The inks were then applied to polyethylene terephthalate, polypropylene, oriented polypropylene, or polyethylene film using an automated K-Coater equipped with either a wire wound rod or anilox proofer and dried in a 50° F. oven for 30 to 60 seconds. The physical and optical properties of the inks were then measured, such as, tape adhesion, water resistance, crinkle resistance, gloss, color strength, and opacity.

In general, the styrene-acrylic dispersions improved the gloss and coloristic properties of the inks as compared to the standard inks Table 1 is a comparison of gloss and opacity measurements for a styrene-acrylic (AC #1) ink and a nitrocellulose (NC) ink. AC #1 is a polymer composition prepared from styrene, methylmethacrylate, 2-ethylhexyl acrylate, methacrylic acid, and acrylic acid. A reaction mixture of monomers, solvent and initiator was continuously supplied to a continuous stirred tank reactor (CSTR) maintained at a constant temperature. Reaction zone mass and feed mass flow rate were controlled to provide a constant average residence time within a desired range typically between 10 to 15 minute range in the CSTR. The reaction temperature of the CSTR was maintained constant at different settings typically within the range of 175°-232° C. The reaction product was continuously pumped to a devolatization zone, and the polymeric product from the devolatization zone was continuously collected.

TABLE 1

Composition of Styrene-acrylic Polymers.

| Ex. | Styrene | AMS | AA | MAA | MMA | 2-EHA | BMA |
|-----|---------|-----|----|----|-----|-------|-----|
| AC#1 | 34 | 0 | 10 | 10 | 16 | 30 | 0 |
| AC#2 | 20 | 0 | 40 | 0 | 31 | 9 | 0 |
| AC#3 | 21 | 27 | 40 | 0 | 10 | 2 | 0 |
| AC#4 | 32 | 36 | 32 | 0 | 0 | 0 | 0 |

TABLE 1-continued

Composition of Styrene-acrylic Polymers.

| Ex. | Styrene | AMS | AA | MAA | MMA | 2-EHA | BMA |
|---|---|---|---|---|---|---|---|
| AC#5 | 38 | 37 | 25 | 0 | 0 | 0 | 0 |
| AC#6 | 35 | 0 | 10 | 8 | 0 | 0 | 47 |

AMS = alpha-Methyl styrene;
AA = Acrylic acid;
MAA = Methacrylic acid;
MMA = Methyl methacrylate;
2-EHA = 2-Ethylhexyl acrylate;
BMA = n-Butyl methacrylate.

Table 2 shows that the same dry film thickness (DFT) and opacity are achieved with the high solids styrene-acrylic based ink using a finer line anilox proofer. The gloss for the styrene-acrylic based ink was increased by approximately 10 to 25%.

TABLE 2

Contrast ratio and gloss of polyamide inks prepared using nitrocellulose [NC] and styrene, acrylic [AC#1] based titanium dioxide dispersions.

| DFT (μm) | Disp | Anilox (lines per inch) | Contrast Ratio | Gloss (b) |
|---|---|---|---|---|
| 1.8 | AC#1 | 180 | 66 | 73 |
| 1.8 | NC | 150 | 67 | 66 |
| 2.0 | AC#1 | 150 | 68 | 80 |
| 2.1 | NC | 120 | 68 | 66 |

Figure 2:
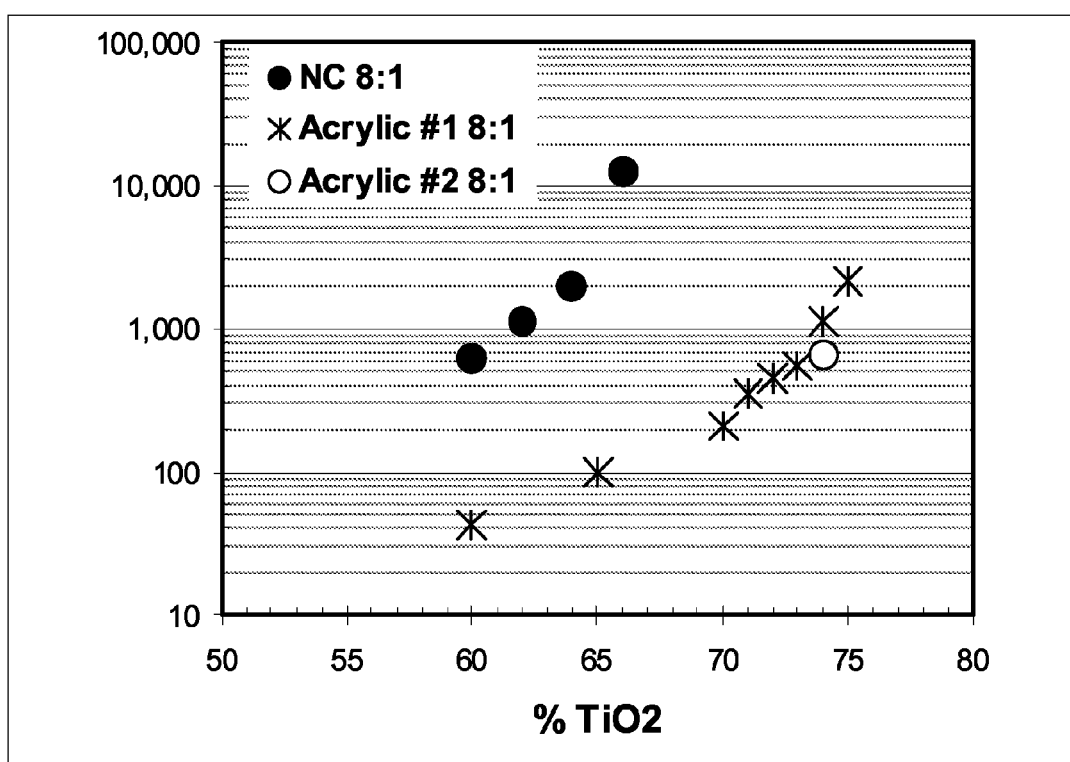
FIG. 2 is a graph of the dispersion viscosity versus the pigment solids content for titanium dioxide dispersions in either nitrocellulose (NC) or nitrocellulose with a styrene-acrylic dispersant (Acrylic #1), according to one example. The pigment solids content, of the dispersions, was varied between 60 and 75%.
Figure 3:
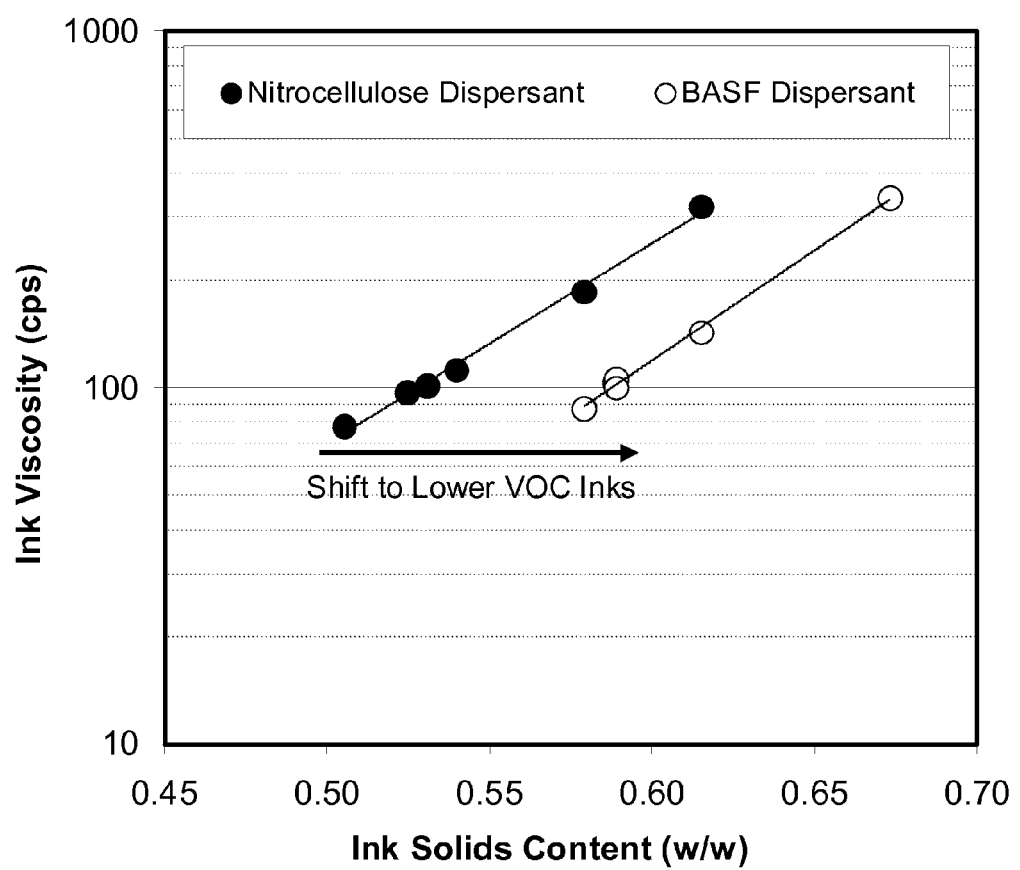
FIG. 3 is a graph of the ink viscosity versus the solids content for polyamide inks prepared using a nitrocellulose dispersant (NC) and a styrene-acrylic dispersant (Acrylic #1) with titanium dioxide dispersions, according to one example.

FIGS. 1 and 2 illustrate that the amount of solvent used can be reduced by as much about 10 to 30% at the dispersion stage and up to about 12% in the inks when the styrene-acrylic dispersants were used in place of nitrocellulose dispersants. As illustrated in FIG. 1, nitrocellulose inks exhibit dispersion viscosities from greater than 10,000 cps to less than 1000 cps over a pigment to binder ratio range from about 4:1 to about 12:1. In contrast, the acrylic #1 samples exhibit significantly lower dispersion viscosities over the same range at the same solids content (i.e. about 60 wt %), or exhibit the same dispersion viscosities, but at a much higher solids content (i.e. about 74 wt %). As shown in FIG. 2, the nitrocellulose based inks have a dispersion viscosity that ranges from 800 to over 10,000 cps when the wt % of pigment (e.g. $TiO_2$) ranges from about 60 to 65%. In contrast, the acrylic #1 and #2 samples exhibit significantly lower viscosity at the same pigment loading levels, achieving similar viscosities as the nitrocellulose inks only at much higher pigment loading levels. FIG. 3 illustrates that when polyamide-based inks are prepared with nitrocellulose dispersants and the styrene-acrylic dispersants, the ink viscosities are similarly reduced as for the dispersant viscosities as illustrated in FIGS. 1 and 2. Such trends indicate that the use of the styrene-acrylic dispersants allows for a reduction in volatile solvents while maintaining about the same viscosities, when compared to traditional nitrocellulose dispersant ink formulations.

Intercoat adhesion and lamination strength were not negatively affected by the replacement of nitrocellulose or polyamide dispersants with the styrene-acrylic dispersants, when tested for surface print and lamination applications.

Figure 4:
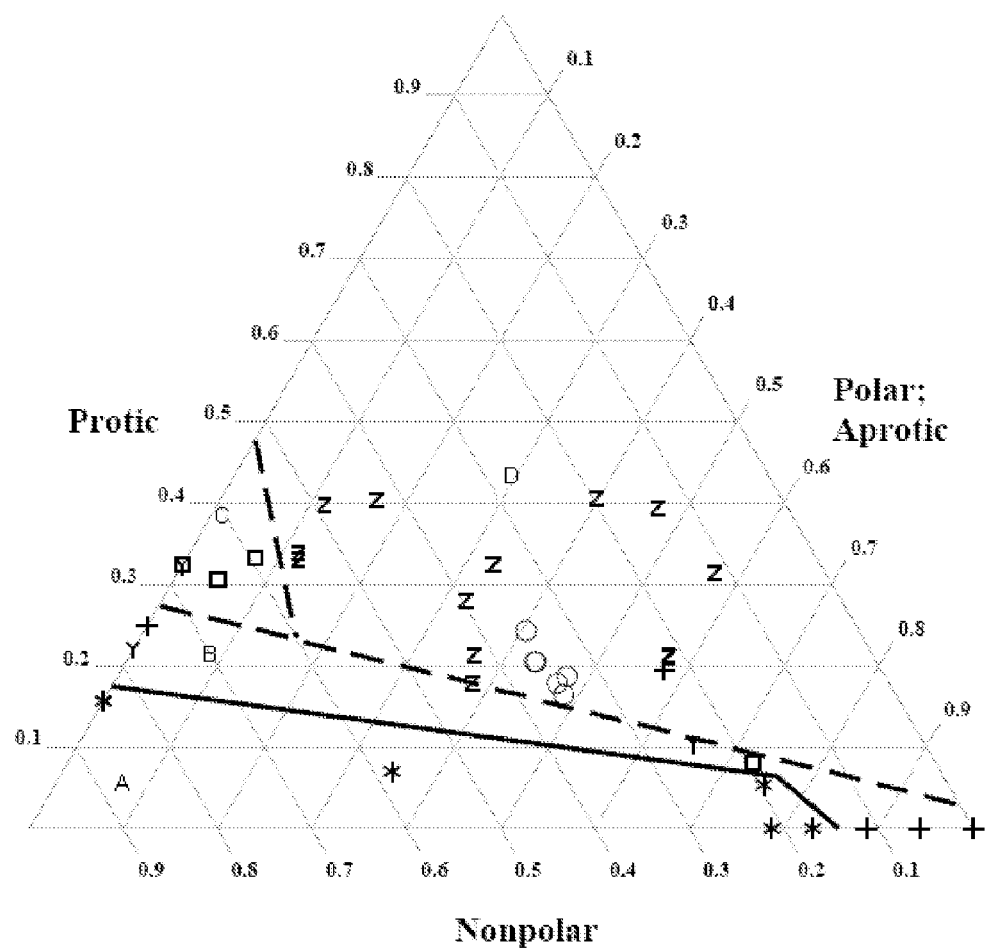
FIG. 4 is a graphical representation of styrene-acrylics in solvents as a composition diagram, according to some embodiments. The solvents are characterized as non-polar, polar aprotic, and polar protic. Region A show compositions that are ethanol insoluble (black stars). Regions B and C show compositions that are unstable (black plus), partially stable (black cross), or incompatible with nitrocellulose or polyurethane (blackY). Region D shows stable dispersions that phase separate upon blending with dimer acid polyamides (black z) or maintain stability throughout ink process (black circle).

Dispersant compositions are summarized in terms of non-polar, polar-aprotic, and polar-protic balance in the diagram in FIG. 4. In FIG. 4, Region A (black stars) indicates insolubility of the dispersant in ethanol. The black pluses in Region B indicates the styrene, acrylic compositions that do not provide stable titanium dioxide dispersions and the black squares in Regions B and C indicate compositions that provided stable dispersions but where were larger in particle size when compared to nitrocellulose and were therefore categorized as poorly performing. In Regions C and D, compositions are shown for stable dispersions that phase separated when blended with thermoplastic polyurethanes, nitrocellulose, and dimer acid polyamides, respectively, due to a poor balance of non-polar, polar-aprotic, and polar-protic functional groups in the dispersant.

The data presented in FIG. 4 indicates that the amount of polar-protic groups in the dispersant affects the interaction between the dispersant and the functionalized surface of a titanium dioxide pigment. Based upon the data, there is an appropriate amount of polar-protic groups in the dispersant for an optimal interaction with a pigment. Additionally, the use of non-polar or polar-aprotic solubilizing agents, containing pendant, terminal, or mainchain polar-protic or polar-aprotic functionality may be used to improve dispersion viscosity and stability. For example, secondary and tertiary amines containing ethoxylate, propoxylate, alkyl, or alkyl phenol groups; alkyl phenols; fatty alcohols; polypropylene, polyethylene oxides and their copolymers; alkyl amides, esters, urethanes, and ureas may be added to the dispersants.

Figure 5:
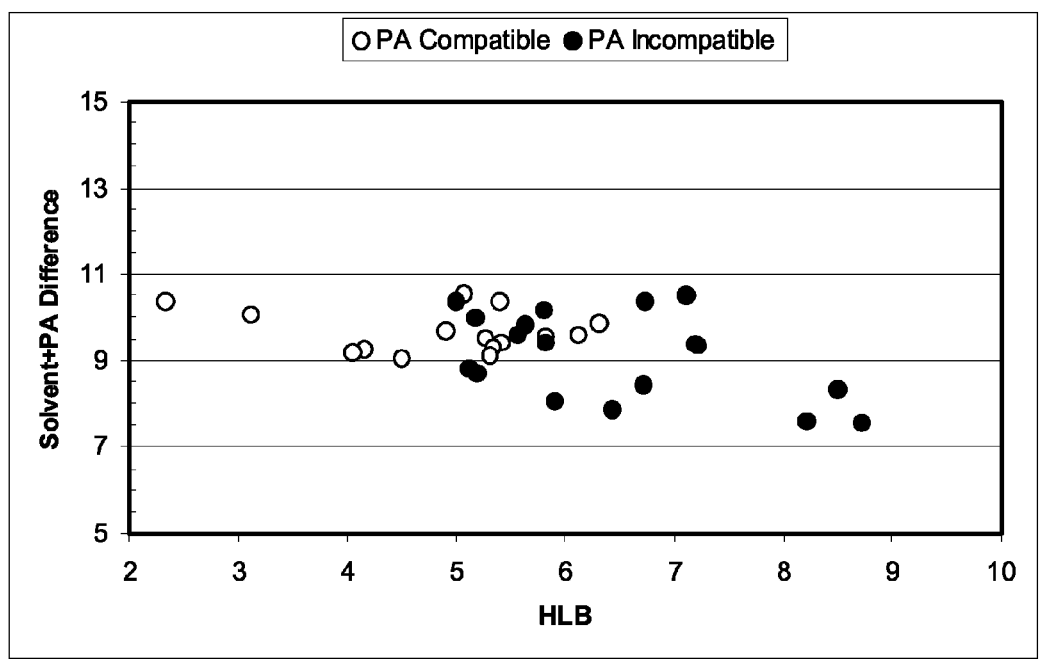
FIG. 5 is a graph of dispersant hydrophilic-lipophilic balance (HLB) versus solvent-polyamide (PA) compatibility, according to some embodiments.

FIG. 5 demonstrates the proper balance between these functional group types. For stability to be maintained in the presence of polyamide ink binders, the HLB should be between about 5 to about 6. When the dispersant HLB is greater than about 5 to about 6, the polymer is predicted to be too compatible with the continuous phase, thereby allowing the binder to be washed away from the pigment, leading to pigment destabilization [white circles]. The opposite is true at lower HLB values. Less than a HLB of about 5 the polymer solubility is too low to maintain a solvated polymer layer on the pigment surface to maintain dispersion stability. The optimal performance is observed between 5 and 6 to provide a strong driving force to the pigment surface and a well solvated dispersant layer. Both stable and unstable dispersions were observed in this region upon polyamide addition [white and black circles between 5 and 6]. The materials that demonstrated instability contained a larger amount of non-polar monomer(s) which appears to lead to poor solvent solubility and compatibility with polyamides.

The present disclosure is not to be limited in terms of the particular embodiments described in this application. Many modifications and variations can be made without departing from its spirit and scope, as will be apparent to those skilled in the art. Functionally equivalent methods, formulations, and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A composition comprising:
  a styrene-acrylic copolymer dispersant polymerized from a reaction mixture comprising:
    15 to 50 wt % of a styrenic monomer;
    10 to 35 wt % of a functional monomer;
    10 to 30 wt % of an $C_1$-$C_4$ alkyl (meth)acrylate;
    20 to 55 wt % of an $C_5$-$C_{12}$ alkyl (meth)acrylate; and
    0 to 20 wt % of a ethylenic monomer;
    wherein the total wt % of the $C_1$-$C_4$ alkyl (meth)acrylate and the $C_5$-$C_{12}$ alkyl (meth)acrylate is less than 60 wt % of the total wt % of the styrenic monomer, the functional monomer, the $C_1$-$C_4$ alkyl (meth)acrylate, the $C_5$-$C_{12}$ alkyl (meth)acrylate, and the ethylenic monomer;
  a polymeric binder;
  a colorant; and
  a solvent;
  wherein: the functional monomer has a carboxylic acid group.

2. The composition of claim 1, wherein the composition is a low VOC solvent-borne printing ink.

3. The composition of claim 1, wherein the polymeric binder is a polyamide, a polyurethane, a nitrocellulose, an acrylic, a maleic, a rosin, a modified rosin, or a mixture of any two or more thereof.

4. The composition of claim 1, wherein the colorant is an inorganic pigment, a, organic pigment, a dye, or a mixture of any two or more thereof.

5. The composition of claim 1, wherein the styrene-acrylic copolymer is produced by a continuous polymerization process.

6. The composition of claim 1, wherein the composition has a viscosity of less than 100 cps at a solid content of at least 60 wt %.

7. The composition of claim 1, wherein:
  the composition has a solids content from about 10% to 30% greater than a comparative composition comprising the polymeric binder, colorant and solvent, without the styrene-acrylic dispersant;
  and the composition and the comparative composition have about the same viscosity.

8. The composition of claim 1, wherein the composition has from about 10% to 30% less solvent than a comparative composition comprising the polymeric binder, colorant and solvent without the styrene-acrylic copolymer dispersant; and the composition and the comparative composition having about the same viscosity.

9. The composition of claim 1, wherein the printing ink has an adhesion rating of at least 90% on a substrates selected from the group consisting of polyethylene terephthalate, polypropylene, and polyethylene film.

10. The composition of claim 1, wherein the solvent is an alcohol, an acetate, a glycol ether, or a mixture of any two or more thereof.

11. The composition of claim 1 further comprising a co-dispersant.

12. The composition of claim 11, wherein the co-dispersant is:
  a high molecular weight A-B block copolymer comprising:
    a block A comprising tertiary amine functionality; and
    a block B comprising styrene and acrylic monomers;
    a surfactant of a tetra-functional block copolymer based on ethylene oxide and propylene oxide having a molecular weight of less than 19,000 and a hydrophilic-lipophilic balance of less than 25;
    a surfactant of a block copolymer based on ethylene oxide and propylene oxide having a molecular weight of less than 8,000 and a hydrophilic-lipophilic balance of less than 26;
    an alkoxylated amine comprising ethylene oxide and propylene oxide and having a molecular weight of approximately less than 7,000; or
    a modified polyurethane.

13. An indicia-coated substrate, the indicia comprising:
  an ink comprising:
    a styrene-acrylic copolymer dispersant polymerized from a reaction mixture comprising:
      15 to 50 wt % of a styrenic monomer;
      10 to 35 wt % of a functional monomer;
      10 to 30 wt % of an $C_1$-$C_4$ alkyl (meth)acrylate;

20 to 55 wt % of an $C_5$-$C_{12}$ alkyl (meth)acrylate; and
0 to 20 wt % of a ethylenic monomer;
wherein the total wt % of the $C_1$-$C_4$ alkyl (meth)acrylate and the $C_5$-$C_{12}$ alkyl (meth)acrylate is less than 60 wt % of the total wt % of the styrenic monomer, the functional monomer, the $C_1$-$C_4$ alkyl (meth)acrylate, the $C_5$-$C_{12}$ alkyl (meth)acrylate, and the ethylenic monomer;
a polymeric binder; and
a colorant;
wherein the ink has a gloss that is from about 5% to 20% greater than an ink comprising the polymeric binder and the colorant, without the styrene-acrylic copolymer dispersant and the functional monomer has a carboxylic acid group.

14. The indicia-coated substrate of claim 13, wherein the polymeric binder is a nitrocellulose, a dimer acid-based polyamide, or a polyurethane.

15. The indicia-coated substrate of claim 14, wherein the substrate is polyethylene terephthalate, polypropylene, or polyethylene.

16. The indicia-coated substrate of claim 13, wherein the ink has a gloss that is about 10% greater than an ink comprising the polymeric binder and the colorant, without the styrene-acrylic copolymer dispersant.

17. The indicia-coated substrate of claim 13, wherein the contrast ratio of the ink is about equal to that of an ink comprising the polymeric binder and the colorant, without the styrene-acrylic copolymer dispersant.

18. The indicia-coated substrate of claim 13, wherein the indicia has a 20° gloss reading of at least 70, and a contrast ratio of at least 65.

19. A composition comprising:
a styrene-acrylic copolymer dispersant polymerized from a reaction mixture comprising:
15 to 50 wt % of a styrenic monomer;
10 to 35 wt % of a functional monomer;
10 to 30 wt % of an $C_1$-$C_4$ alkyl (meth)acrylate;
20 to 55 wt % of an $C_5$-$C_{12}$ alkyl (meth)acrylate; and
0 to 20 wt % of a ethylenic monomer;
wherein the total wt % of the $C_1$-$C_4$ alkyl (meth)acrylate and the $C_5$-$C_{12}$ alkyl (meth)acrylate is less than 60 wt % of the total wt % of the styrenic monomer, the functional monomer, the $C_1$-$C_4$ alkyl (meth)acrylate, the $C_5$-$C_{12}$ alkyl (meth)acrylate, and the ethylenic monomer, and the functional monomer has a carboxylic acid group;
a polymeric binder;
a colorant;
a co-dispersant that is:
a high molecular weight A-B block copolymer comprising:
a block A comprising tertiary amine functionality; and
a block B comprising styrene and acrylic monomers;
a surfactant of a tetra-functional block copolymer based on ethylene oxide and propylene oxide having a molecular weight of less than 19,000 and a hydrophilic-lipophilic balance of less than 25;
a surfactant of a block copolymer based on ethylene oxide and propylene oxide having a molecular weight of less than 8,000 and a hydrophilic-lipophilic balance of less than 26;
an alkoxylated amine comprising ethylene oxide and propylene oxide and having a molecular weight of approximately less than 7,000; or
a modified polyurethane; and
a solvent.

20. The composition of claim 19, wherein the composition is a low VOC, high solids, solvent-borne printing ink.

21. The composition of claim 19, wherein the composition has a viscosity of less than 100 cps at a solid content of at least 60 wt %.

* * * * *